United States Patent Office 2,800,471
Patented July 23, 1957

2,800,471
N-PROPYLUREA DERIVATIVES

Gerhard Rudolf Wendt, Havertown, Pa., assignor to American Home Products Corporation, New York, N. Y., a corporation of Delaware No Drawing. Application August 25, 1955,
Serial No. 530,643

8 Claims. (Cl. 260—242)

This invention relates to novel N-propylurea derivatives and more particularly to compounds having the structure:

$$NH_2 \cdot CO \cdot NH \cdot (C_3H_5) \text{ (R) (HgX)}$$

in which X represents an acid radical, e. g., Cl, Br, ($\frac{1}{2}SO_4$), $CH_3CO_2$, and R is an organic-substituted amino group having a molecular weight not over about 125, the organic substituent being a saturated nitrogen heterocycle containing the amino nitrogen, or a di-lower-alkyl group.

These compounds are useful as chemical intermediates and have valuable physiological properties, showing diuretic effects when administered orally to animals and having potential clinical utility. They also have a selective bactericidal and fungicidal activity against certain organisms in vitro. They are bases which readily form hydrohalides and their readily formed salts are comprised in the invention. In the specification and claims, reference to these bases is intended to include their readily formed $N^V$ salts unless otherwise noted.

It is an object of this invention to provide N-propylurea derivatives containing mercury which are of simple structure and easy and cheap to prepare. Other objects and advantages will be apparent to those skilled in the art from the following disclosure It has been discovered that mercuric chloride or bromide and certain substituted nitrogen compounds having a molecular weight not over about 125, such as dimethylamine, diethylamine, dipropylamine, piperidine, morpholine, pyrrolidine, hexamethyleneimine and N-methylpiperazine can be simultaneously added to the double bond of allyl urea to yield compounds of the formula given above. Instead of the chloride or bromide, other salts of mercury$^{II}$ may be used such as the sulfate and the acetate.

The structure of these compounds is believed to be:

$$NH_2.CO.NH.CH_2.\underset{\underset{R}{|}}{CH}.CH_2.HgX$$

An alternative structure, however, is possible:

$$NH_2.CO.NH.CH_2.\underset{\underset{HgX}{|}}{CH}.CH_2.R$$

and the present invention does not depend on the assignment of one or the other structure to the new compounds.

According to this invention, allyl urea is dissolved in the nitrogen compound and the finely divided mercuric halide is gradually added in solid form with agitation. After permitting the addition reaction to go to completion at room temperature or below, the desired product is recovered by a suitable precipitation procedure and is recrystallized, or is purified by forming an acid salt such as the hydrochloride. Alternatively the reaction mixture may be diluted with a suitable solvent such as ethylacetate or isopropanol and the mercuric halide may also be dissolved in such a solvent before addition to the reaction.

Specific embodiments of this invention are disclosed in the following examples, but these examples are intended to be illustrative only and not to limit this invention, the scope of which is defined in the appended claims.

EXAMPLE 1
γ-Chloromercuri-β-pyrrolidinopropylurea

*Procedure A.*—To the solution of 10.0 g. (=0.10 M) of allylurea in 100 ml. of pyrrolidine was added 27.2 g. (=0.10 M) of pulverized mercuric chloride in small portions and with shaking. The reaction mixture was occasionally cooled with tapwater to keep the temperature below 25° C. It was kept for 20 hours between 2–4° C. and then 25 hours at room temperature. Some elementary mercury separated. The solution was decanted and poured into 500 ml. of isopropanol. A white precipitate resulted. It was filtered and washed with 100 ml. of isopropanol. 26.5 g. (65%).

2 g. of the crude mercurial was recrystallized from a mixture of 400 ml. of methanol and 500 ml. of ethanol, yielding 1.7 g., M. P. 138° C. (decomposition). Analysis: Calc'd. for $C_8H_{16}ClHgN_3O$: Hg, 49.37; N, 10.37; Cl, 8.73. Found: Hg, 49.45; N, 10.48; Cl, 8.60. The compound has the following probable structure:

$$NH_2-CO-NH-CH_2-\underset{\underset{N}{|}}{CH}-CH_2-Hg-Cl$$

*Hydrochloride.*—24.5 g. of the crude mercurial was dissolved in 32.5 ml. of 2 N hydrochloric acid by warming on a waterbath and the resulting solution was filtered. The slightly yellow filtrate showed a pH of 2.0. Addition of 100 ml. of acetone precipitated the hydrochloride of the mercurial in small crystals. Yield, 22.0 g.; M. P. 125–6° C. (decomposition). Recrystallization from water yielded large clusters of crystals, but the M P. did not change. Analysis: Calc'd. for $C_8H_{17}Cl_2HgN_3O$: Hg, 45.30; N, 9.49; Cl, 16.01. Found: Hg, 45.32; N, 9.42; Cl, 15.88.

*Procedure B.*—The solution of 40.0 g. (0.40 M) of allylurea in 165.2 ml. (=2.00 M) of pyrrolidine was diluted with 200 ml. of ethylacetate. To this solution was added the solution of 108.8 g. (=0.40 M) of mercuric chloride in 480 ml. of ethylacetate dropwise and with vigorous stirring over a period of one hour. The temperature was kept between 20° and 25° C. by cooling with an ice-water mixture. Stirring was continued for 6 hours at room temperature. To the reaction mixture was added 400 ml. of isopropanol. After cooling with ice water the reaction product was collected on a Büchner funnel. The cake was suspended in 400 ml. of isopropanol and the mixture was stirred for 15 minutes. After filtering and drying 103 g. of the product was obtained. The hydrochloride was prepared as described in Procedure A.

EXAMPLE 2
γ-Chloromercuri-β-morpholinopropylurea

Ten grams (=0.10 M) of allylurea was dissolved in 100 ml. of morpholine at room temperature. 27.2 g. (=0.10 M) of mercuric chloride was added in small portions with shaking, and the reaction mixture was occasionally cooled with tapwater to keep the temperature below 25° C. After the addition of the mercuric chloride, the reaction mixture was placed on a shaker for 20 hours and thereafter it was triturated with 1000 ml. of ether for ½ hour. Ether was decanted and the viscous mercurial was triturated again with 1500 ml. of fresh ether. On standing under ether, the compound finally solidified.

It was filtered and washed with 100 ml. of ether. The mixture of the mercurial with morpholine hydrochloride weighed 56.0 g. To remove the morpholine hydrochloride, the mixture was recrystallized from methanol, yielding 23.5 g. (55%); M. P. 130°–131° C. After recrystalizing from ethanol the compound melted at 138.5°–39.0° C. (decomposition). Analysis: Calc'd. for $$C_8H_{16}HgClN_3O_2$$

Hg: 47.51; N, 9.95. Found: Hg, 47.60; N, 10.01.

The compound has the following probable structure:

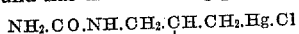
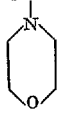

*Hydrochloride.*—4.2 g. of the compound was dissolved in 50 ml. of 0.2 N hydrochloric acid at room temperature. A small amount of insoluble material was removed by filtration and the clear, colorless filtrate was concentrated to about 15 ml. in vacuo (bath temperature 35° C.). A little precipitate was removed by centrifuging. To the supernatant acetone was added to incipient turbidity. 3.2 g. of crystallized material was obtained. M. P. 111–12° C. (decomposition). Analysis: Calc'd. for $C_8H_{17}HgCl_2N_3O_2$: Cl, 15.46. Found: Cl, 15.20.

EXAMPLE 3

*γ-Chloromercuri-β-piperidinopropylurea*

*Procedure A.*—5.0 g. (=0.05 M) of allylurea was dissolved in 50 ml. of piperidine with stirring at room temperature. To the solution was added 13.6 g. (=0.05 M) of mercuric chloride in small portions and over a period of 1½ hours.

After the addition of the mercuric chloride the stirring was continued for 1 hour. On the addition of 100 ml. of isopropanol the mercurial separated. It was filtered and dried. The residue weighed 16.6 g. (79%). The crude mercurial was recrystallized from ethanol and isopropanol; M. P. 120°–21° C. Analysis: Calc'd for $C_9H_{18}HgClN_3O$: Hg, 47.73; N, 10.00; C, 25.72; H, 4.32. Found: Hg, 47.73; N, 10.07; C, 25.84; H, 4.46.

The compound has the following probable structure:

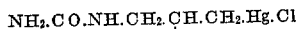
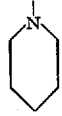

*Hydochloride.*—11.0 g. of the mercurial was dissolved in 53.4 ml. of 0.5 N hydrochloric acid by warming on a steambath until the inside temperature of the reaction mixture reached 70° C. The mercurial was easily dissolved. A small amount of gray insoluble material was removed by filtration. The solution had a pH of 2.0. The filtrate was cooled to 40° C. After the addition of 110 ml. of acetone the hydrochloride began to crystallize. After standing in the cold room for 20 hours the product was filtered and dried. 10.0 g. M. P. 125–6° C. (decomposition). Analysis: Calc'd. for $C_9H_{19}Cl_2HgN_3O$: Hg, 43.92; N, 9.20; Cl, 15.52; C, 23.66; H, 4.19. Found: Hg, 44.37; N, 9.13; Cl, 15.70; C, 23.70; H, 4.20.

*Procedure B.*—To the solution of 5.0 g. (=0.05 M) of allylurea in 49.5 ml. (=0.50 M) of piperidine was added the solution of 13.6 g. (=0.05 M) of mercuric chloride in 100 ml. of isopropanol dropwise and with shaking. The reaction mixture was occasionally cooled with tapwater to keep the temperature below 25° C. After the addition of the mercuric chloride the reaction mixture was placed on the shaker for 64 hours. Some insoluble gray material and about 2.0 g. of piperidine hydrochloride were removed by filtration. The filtrate was added to 400 ml. of ether with shaking. A viscous precipitate separated. After triturating with ether it finally solidified. It was filtered through a Büchner funnel and washed twice with 100 ml. of ether each time. The reaction product was stirred twice with 40 ml. of water each time for one hour. It was collected on a Büchner funnel and dried over anhydrous calcium chloride. The product weighed 12.0 g. The hydrochloride, prepared in the same manner as described above, decomposed at 125–6° C.

*Procedure C.*—To the solution of 40.0 g. of pulverized allylurea in the freshly made mixture of 198 ml. of piperidine and 200 ml. of ethylacetate was added the solution of 108.6 g. of mercuric chloride in 480 ml. of ethylacetate dropwise and with stirring over a period of one hour. The temperature was not allowed to rise above 30° C. After the addition of about half of the mercuric chloride a permanent white precipitate was formed. The reaction mixture was placed on a shaker for 40 hours at 25–27° C. The product was filtered and washed with 400 ml. of ethylacetate. After breaking the filter cake in small pieces, it was vigorously stirred in 400 ml. of water for 10 minutes and filtered. The cake was treated with water once more. The last drops of the second filtrate showed a pH of 7.0 to 7.5. After drying the material weighed 110 g. The hydrochloride was prepared as described before.

EXAMPLE 4

*γ-Chloromercuri-β-diethylaminopropylurea*

5.0 g. (=0.05 M) of allylurea was mostly dissolved in 25.7 ml. (0.25 M) of diethylamine by stirring the suspension at room temperature. 25 ml. of ethylacetate was added, but did not dissolve the allylurea completely. After cooling the mixture to 8° C. a solution of 13.6 g. (=0.05 M) of mercuric chloride in 60 ml. of ethylacetate was added dropwise and with stirring over a period of 45 minutes. The stirring was continued for one hour while the reaction mixture was attaining room temperature. After shaking for 16 hours a grayish product was formed. It was collected on a Büchner funnel. The material was suspended in 60 ml. of chloroform and vigorously stirred for five minutes. After filtering, the compound was washed with 15 ml. of chloroform. After two more treatments with chloroform, the dried product weighed 12.3 g., M. P. 98–100° C. (crude material).

*Hydrochloride.*—12.3 g. was dissolved in a mixture of 72 ml. of water and 12 ml. of 2 N hydrochloric acid by heating on a water bath. (Temperature of the solution 60° C.) The solution was filtered. The product was precipitated by the addition of 200 ml. of acetone. It was filtered and dried. 10.1 g., M. P. 97° C. (decomposition). Recrystallization from water did not change the melting point. Analysis: Calc'd. for $$C_8H_{19}HgCl_2N_3O$$

Hg, 45.10; Cl, 15.94; N, 9.45; C, 21.60; H, 4.31. Found: Hg, 45.10; Cl, 15.87; N, 9.35; C, 21.58; H, 4.32

The hydrochloride has the following probable structure:

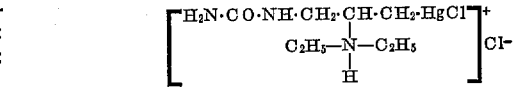

EXAMPLE 5

*γ-Chloromercuri-β-dimethylaminopropylurea*

16.5 ml. (=0.25 M) of dimethylamine was added to the solution of 5.0 g. (=0.05 M) of allylurea in 25 ml. of isopropanol at 5° C. To this mixture was added the solution of 13.6 g. (=0.05 M) of mercuric chloride in 140 ml. of isopropanol dropwise and with vigorous stirring over a period of one hour. The reaction mixture was placed on a shaker for 24 hours at 7° C. and thereafter for 70 hours at 25° C. After filtering, the precipitate was suspended in 50 ml. of chloroform and vigorously stirred for 15 minutes. The product was filtered and the treatment with chloroform was repeated once more. Yield 14.2 g., M. P. 115–8° C. (crude product).

The compound has the following probable structure:

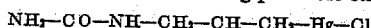
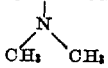

*Hydrochloride.*—14.2 g. of the material was heated with 72.6 ml. of 0.5 N hydrochloric acid to 80° C. on a water bath. Most of the product was dissolved. The insoluble material was removed by filtration. The filtrate had a pH of 2.0–2.5. 400 ml. of acetone was added to the filtrate to incipient turbidity. After standing for 15 hours at 3° C. the hydrochloride of the mercurial was filtered off and washed with 50 ml. of acetone. Yield 8.5 g. After recrystallizing from dilute hydrochloric acid and acetone the compound melted at 114–5° C. Analysis: Calc'd. for $C_6H_{15}Cl_2HgN_3O$: Hg, 48.14; Cl, 17.02; C, 17.30; H, 3.63. Found: Hg, 47.50; Cl, 17.32; C, 17.58; H, 3.67.

EXAMPLE 6

*γ-Chloromercuri-β-di-n-propylaminopropylurea*

This compound was made by the method described in Example 3, Procedure A, using di-n-propylamine instead of piperidine. The hydrochloride is easily soluble in hot water (80° C.) but only moderately soluble in cold water (3° C.); it is insoluble in acetone. M. P. 106–7° C. (decomposition).

Analysis of hydrochloride: Calc'd. for $$C_{10}H_{23}Cl_2HgN_3O$$

Hg, 42.45; Cl, 15.00; N, 8.88. Found: Hg, 42.70; Cl, 14.90; N, 9.05.

The compound has the following probable structure:

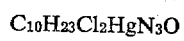
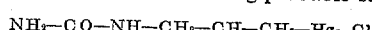
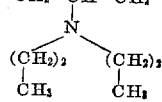

EXAMPLE 7

*γ-Chloromercuri-β-hexamethyleneiminopropylurea*

This compound was prepared by the method described in Example 1, Procedure B, using hexamethyleneimine instead of pyrrolidine. The hydrochloride is soluble in warm water but only moderately soluble in cold water. M. P. 116–7° C. (decomposition). Analysis of hydrochloride: Calc'd. for $C_{10}H_{21}Cl_2HgN_3O$: Hg, 42.61; Cl, 15.06; N, 8.93. Found: Hg, 42.60; Cl, 15.02; N, 8.82.

The compound has the following probable structure:

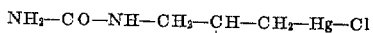
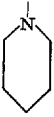

EXAMPLE 8

*γ-Chloromercuri-β-(1-methyl-4-piperazino)propylurea*

This compound was made by the method described in Example 1, Procedure B, using N-methylpiperazine instead of pyrrolidine. The compound was recrystallized from acetone. M. P. 119.0–119.5° C. (decomposition). Calc'd. for $C_9H_{19}ClHgN_4O$: Hg, 46.08; Cl, 8.15; N, 12.87. Found: Hg, 45.90; Cl, 7.91; N, 12.60.

The compound has the following probable structure:

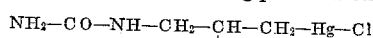
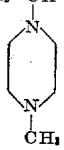

The following derivatives of the compound of Example 1 have been made by utilizing the appropriate mercuric salt:

*γ - Bromomercuri - β - pyrrolidinopropylurea.*—M. P. 136.5–7.0° C. (decomposition). Calc'd. for $$C_8H_{16}BrHgN_3O$$

Hg, 44.51; N, 9.32; Br, 17.73. Found: Hg, 44.73; N 9.17; Br, 16.98. The compound is slightly soluble in water, methanol, ethanol, isopropanol, but insoluble in acetone.

*Hydrochloride.*—M. P. 112–3° C. (decomposition.) Calc'd. for $C_8H_{17}BrClHgN_3O$: Cl, 7.28. Found: Cl, 7.02. The compound is soluble in water and insoluble in acetone.

*γ - Sulfato-bis(mercuri - β - pyrrolidinopropylurea)sulfate.*—Calc'd. for $C_{16}H_{34}Hg_2N_6O_{10}S_2$: Hg, 42.87; S, 6.85; N, 8.98. Found: Hg, 42.57; S, 6.48; N, 9.11. The compound is soluble in water, but insoluble in acetone.

*γ - Acetoxymercuri - β - pyrrolidinopropylurea acetate.*—Calc'd. for $C_{12}H_{23}HgN_3O_5$: Hg, 40.95; N, 8.58. Found: Hg, 40.93; N, 8.33.

*γ - Chloromercuri - β - pyrrolidinopropylurea theophyllinate.*—Calc'd. for $C_{15}H_{24}ClHgN_7O_3$: Hg, 34.21; Cl, 6.05. Found: Hg, 33.60; Cl, 5.76. The compound is soluble in water.

In an analogous way the following derivative of the compound of Example 3 has been made:

*γ - Acetoxymercuri - β - piperidinopropylurea.*—Calc'd. for $C_{13}H_{25}HgN_3O_5$: Hg, 39.81; N, 8.34; C, 30.98; H, 5.00. Found: Hg, 40.04; N, 8.24; C, 30.96; H, 5.43. The compound is soluble in water, methanol and ethanol. It is hygroscopic.

The compounds disclosed above have biostatic effects on various bacteria, yeasts and fungi. Among them the dipropylamino compound of Example 6, the hexamethylimino compound of Example 7 and the 4-methylpiperazino compound of Example 8 show particularly interesting inhibitory action on various microrganisms in vitro.

I claim:

1. Substituted mercuripropylureas having the formula:

$$NH_2 \cdot CO \cdot NH \cdot (C_3H_5)(R)(HgX)$$

and the acid addition salts thereof in which R is a secondary amine attached by its nitrogen atom to the propyl chain and having a molecular weight not over about 125 and X is an acid radical selected from the group consisting of Cl, Br, ½(SO₄) and CH₃CO₂ the R and HgX groups having been introduced by addition of a compound RH to and condensation of a salt HgX₂ with allyl urea.

2. Substituted mercuripropylureas and the acid addition salts thereof as defined in claim 1 in which R is selected from the class consisting of dimethylamino, diethylamino, dipropylamino, pyrrolidino, piperidino, morpholino, hexamethyleneimino and 4-methyl piperazino radicals.

3. A compound according to claim 1 in which X is Cl and R is dimethylamino.

4. A compound according to claim 1 in which X is Cl and R is diethylamino.

5. A compound according to claim 1 in which X is Cl and R is pyrrolidino.

6. A compound according to claim 1 in which X is Cl and R is piperidino.

7. A compound according to claim 1 in which X is Cl and R is morpholino.

8. The method of preparing substituted mercuripropylureas which comprises mixing with allylurea a nitrogenous compound selected from the group consisting of dimethylamine, diethylamine, dipropylamine, pyrrolidine, piperidine, morpholine, hexamethyleneimine and N-methyl piperazine, slowly adding to the resulting mixture with agitation a mercuric halide other than the iodide and fluoride while maintaining the mixture at a temperature not above room temperature whereby the secondary nitrogen atom of the nitrogenous compound and the mercury atom of the mercuric halide become attached respectively to the two unsaturated carbon atoms of the allyl group.

References Cited in the file of this patent

UNITED STATES PATENTS 2,635,983     Foreman _____ Apr. 21, 1953

OTHER REFERENCES

Rowland et al.: Jour. Am. Chem. Soc., vol. 73, pp. 3691–93 (1951).

UNITED STATES PATENT OFFICE
Certificate of Correction

Patent No. 2,800,471           July 23, 1957

Gerhard Rudolf Wendt

It is hereby certified that error appears in the printed specification of the above numbered patent requiring correction and that the said Letters Patent should read as corrected below.

Column 5, lines 51 to 56, inclusive, Example 7, the probable structure should appear as shown below instead of as in the patent:

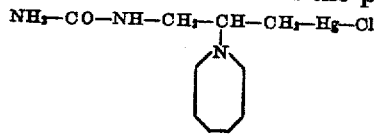

Signed and sealed this 21st day of January 1958.

[SEAL]

Attest:
KARL H. AXLINE,
*Attesting Officer.*

ROBERT C. WATSON,
*Commissioner of Patents.*